US008332606B2

(12) United States Patent
Boldyrev et al.

(10) Patent No.: US 8,332,606 B2
(45) Date of Patent: Dec. 11, 2012

(54) SYSTEM AND METHOD FOR DISTRIBUTED PERSISTENT COMPUTING PLATFORM

(76) Inventors: Sergey Boldyrev, Söderkulla (FI); Jarmo Arponen, Espoo (FI); Antti Lappeteläinen, Espoo (FI)

( * ) Notice: Subject to any disclaimer, the term of this patent is extended or adjusted under 35 U.S.C. 154(b) by 776 days.

(21) Appl. No.: 12/484,801

(22) Filed: Jun. 15, 2009

(65) Prior Publication Data
US 2010/0318712 A1 Dec. 16, 2010

(51) Int. Cl.
G06F 13/18 (2006.01)
(52) U.S. Cl. ...................................................... 711/167
(58) Field of Classification Search ........................ None
See application file for complete search history.

(56) References Cited

U.S. PATENT DOCUMENTS

| | | | |
|---|---|---|---|
| 7,917,913 B2 * | 3/2011 | Eker et al. ...................... | 719/315 |
| 2003/0073412 A1 * | 4/2003 | Meade, II ....................... | 455/70 |
| 2005/0138630 A1 | 6/2005 | Reynolds | |
| 2005/0164679 A1 * | 7/2005 | Beardow .................... | 455/412.1 |
| 2006/0010132 A1 * | 1/2006 | Mathews ........................ | 707/10 |
| 2007/0263455 A1 | 11/2007 | Cornwell et al. | |
| 2008/0304307 A1 * | 12/2008 | Gopalakrishnan .............. | 365/51 |

FOREIGN PATENT DOCUMENTS

| | | |
|---|---|---|
| WO | WO2005038678 | 4/2005 |
| WO | WO2007024271 | 3/2007 |
| WO | WO2008135629 | 11/2008 |

OTHER PUBLICATIONS

International Search Report dated Aug. 5, 2010 for corresponding International Application No. PCT/FI2010/050260.
M. Rabin, "Efficient Dispersal of Information for Security, Load Balancing, and Fault Tolerance", Journal of the ACM, vol. 36(2), pp. 335-348, 1989.
Hugo Krawczyk, "Distributed Fingerprints and Secure Information Dispersal", in Proc. 12th ACM Symposium on Principles of Distributed Computing (PODC), pp. 207-218, 1993.
Ian Oliver et al., "Personal Semantic Web Through a Space Based Computing Environment", In proceedings: Middleware for the Semantice Web, Seconds IEEE International Conference on Semantic Computing, Santa Clara, CA, USA, Aug. 4-7, 2008.
Xiaohang Wang, et al., Semantic Space: An Infrastructure for Smart Spaces, PERVASIVEcomputing Published by the IEEE CS and IEEE ComSoc, Jul.-Sep. 2004, pp. 32-39.

* cited by examiner

Primary Examiner — Duc Doan
(74) Attorney, Agent, or Firm — Locke Lord LLP

(57) ABSTRACT

Example embodiments of the invention are disclosed for an adaptive computing platform wherein a reader/writer device uses distributed, external memory resources as non-volatile memory blocks to provide distributed execution-in-place capability for the reader/writer device, such as a mobile phone, to enhance the processing power of the device. The execution architecture of the reader/writer device is scalable and adaptive to accommodate variations in the speed, size, and other characteristics of different external memory blocks it uses as it moves from one external memory block to another.

18 Claims, 7 Drawing Sheets

RF BASED MEMORY (ULS) ARCHITECTURE DIAGRAM, EACH OPTIONAL BLOCK (DOTTED)
CAN BE JUSTIFIED AGAINST THE ACTUAL NEEDS AND CONFIGURATION OF THE COMPUTING ENVIRONMENT

STEP 402: COMMUNICATING USING A COMMUNICATIONS INTERFACE, WITH ONE OR MORE EXTERNAL DEVICES CONTAINING ONE OR MORE SUITABLE MEMORY MODULES;

STEP 404: EXECUTING-IN-PLACE IN A PROCESSOR, PROGRAM CODE STORED IN THE ONE OR MORE SUITABLE MEMORY MODULES OF ANY OF THE ONE OR MORE EXTERNAL DEVICES WHEN COMMUNICATING WITH SAID ANY OF THE ONE OR MORE EXTERNAL DEVICES; AND

STEP 406: MAKING ADJUSTMENTS WITH AN OPERATING SYSTEM, TO AN INTERFACE WITH THE EXTERNAL DEVICES BASED ON DETECTED CHARACTERISTICS OF THE ONE OR MORE SUITABLE MEMORY MODULES CONTAINED IN THE EXTERNAL DEVICE WITH WHICH IT IS CURRENTLY COMMUNICATING.

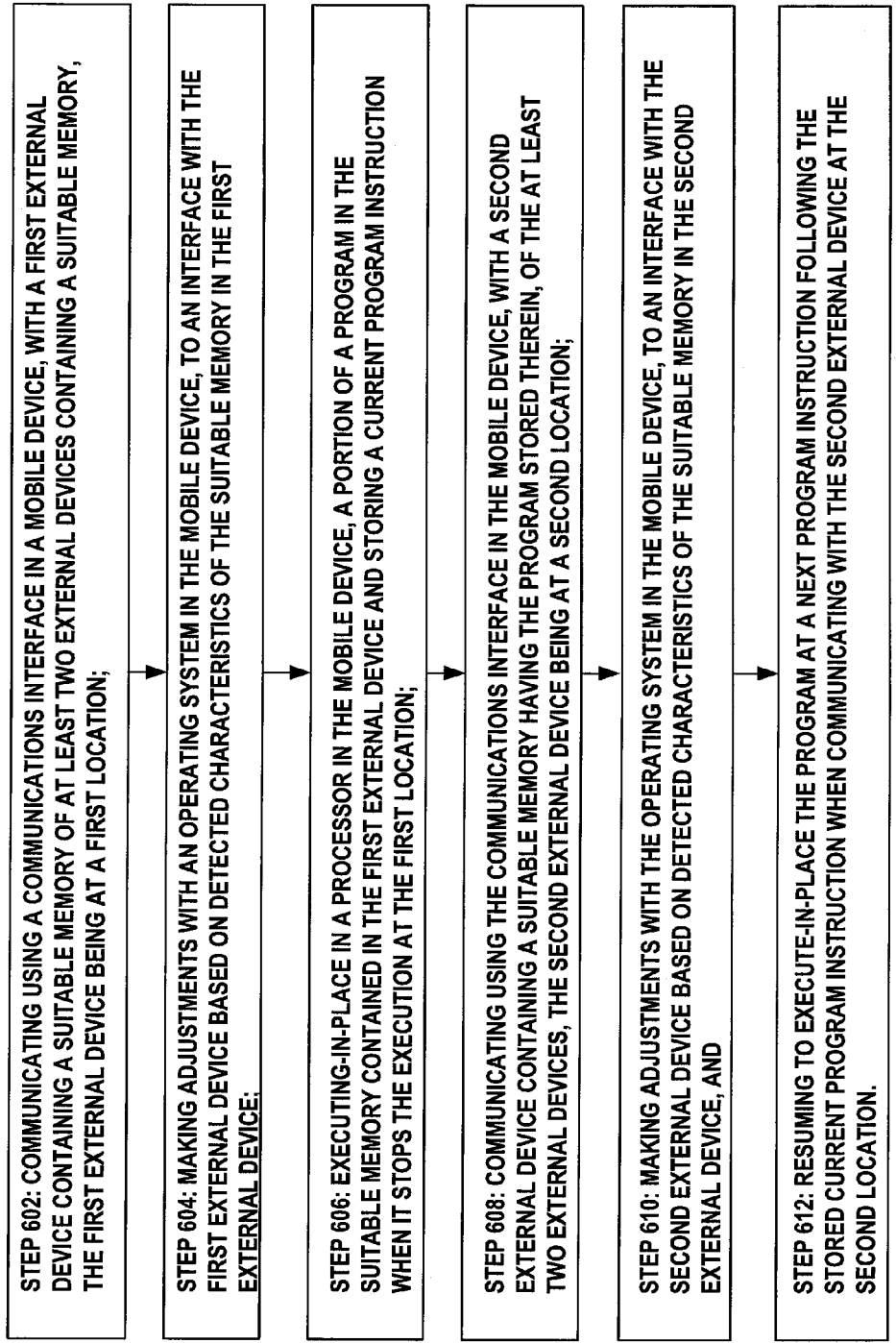

SYSTEM AND METHOD FOR DISTRIBUTED PERSISTENT COMPUTING PLATFORM

FIELD

The technical field relates to computing systems, and more particularly to an adaptive computing platform that may utilize external memory resources as non-volatile memory blocks to provide execution-in-place capability for a computing device to enhance the processing power of the device.

BACKGROUND

The Micro-Nano integrated platform for transverse Ambient Intelligence applications, (MINAmI) Project, Supported by the European Commission through the Sixth Framework Programme for Research and Development, addresses Ambient Intelligence (AmI) applications, where the personal mobile device acts as a gateway. With the MINAmI Ambient Intelligence system, the physical environment can be loaded with interesting and context related information, easily and naturally accessible to the user. Information is in the tags and sensors embedded in physical surroundings and everyday objects, and it can be anything from sensor measurements from the environment or the user itself, to a piece of music or the latest news. The user can wirelessly access this information content by just touching or scanning close tags and sensors with an apparatus capable of machine reading the information content. The apparatus, such as a mobile phone may also enable wireless connection to the internet. As the interaction can be tied to a specific place, object, and time, the user is served with context related information and services. The MINAmI Project is intended to define a communication protocol/system for providing high data rate communication between a reader/writer device and large memory containing radio frequency (RF) tags operating over a very high data rate communication channel.

SUMMARY

Various aspects of examples of the invention are set out in the claims.

Example embodiments of the invention are disclosed for an adaptive computing platform wherein a reader/writer device uses distributed, external memory resources as non-volatile memory blocks to provide distributed execution-in-place capability for the reader/writer device, such as a mobile communications device, PDA, cell phone, laptop or palmtop computer, wearable communications device, automotive communications device, or the like, to enhance the processing power of the device. The execution architecture of the reader/writer device is scalable and adaptive to accommodate variations in the speed, size, and other characteristics of different external memory blocks it uses as it moves from one external memory block to another.

The example embodiments of the invention provide an operating system in the reader/writer device, which makes adjustments to the interface with the external memory blocks based on detected type of non-volatile memory resource it currently is communicating with.

In example embodiments of the invention, when a reader/writer device moves from using a first external memory block based on a first technology to using a second external memory block based on a second technology, the operating system of the reader/writer device may adjust its interface to the different external memory characteristics.

In example embodiments of the invention, the same program or data file may be stored in several external memory blocks at several respective locations, allowing the reader/writer device to move from one location to another. The reader/writer device may execute-in-place a portion of the program in a first external memory block at the first location and store the current program instruction when it stops the execution at the first location. It may then move to the second location with a second external memory block, where it may resume to execute-in-place the program by resuming at the next program instruction following the previously stored current program instruction.

In an example embodiment of the invention, a communications interface is configured to communicate with one or more external devices containing one or more suitable memory modules. A processor is configured to provide distributed execution-in-place capability for the apparatus when communicating with any of the one or more external devices. And, an operating system is configured to make adjustments to an interface with the external devices based on detected characteristics of the one or more suitable memory modules contained in the external device with which it is currently communicating.

In an example embodiment of the invention, a communications interface in an apparatus is configured to communicate with one or more external memory blocks. A processor is configured to provide distributed execution-in-place capability for the apparatus when communicating with any of the one or more external memory blocks. And an operating system configured to make adjustments to an interface with the external memory blocks based on detected characteristics of the external memory block with which the apparatus is currently communicating.

In an example embodiment of the invention, a communications interface in a reader/writer device is configured to communicate with one or more external memory blocks. A processor in the reader/writer device is configured to provide distributed execution-in-place capability for the reader/writer device when communicating with each of the external memory blocks. And an operating system in the reader/writer device is configured to make adjustments to an interface with the external memory blocks based on detected characteristics of the external memory block with which it is currently communicating. The reader/writer device may be a mobile communications device, a cell phone, a personal digital assistant, a laptop computer, a palmtop computer, a wearable communications device, an automotive communications device, or the like. The detected characteristics of the external memory block may include speed, size, response time or data persistence. The operating system and processor may be further configured to execute-in-place a portion of a program in a first external memory block at a first location and store a current program instruction when it stops the execution at the first location. The operating system and processor may be further configured to resume to execute-in-place the program by resuming at a next program instruction following the stored current program instruction when the reader/writer device has moved to a second location with a second external memory block having the program stored therein. The external memory blocks may be non-volatile memories such as phase-change memory, resistive random access memory, magnetic random access memory, solid-electrolyte memory, ferroelectric random access memory, organic and polymer memory, and the like.

In an example embodiment of the invention, a communications interface in a first device is configured to communicate with a second device. A suitable memory module in the first device is configured to store code and data to provide to the second device to enable distributed execution-in-place for the second device when the first device is communicating with the second device. And a buffer in the first device is configured to store characteristic values of the suitable memory to provide to the second device to enable the second device to make adjustments to an interface with the first device based on the characteristic values.

In an example embodiment of the invention, a communications interface in an external memory module is configured to communicate with a mobile device. A memory in the external memory module is configured to store code and data to provide to the mobile device to enable distributed execution-in-place for the mobile device when the external memory module is communicating with the mobile device. And a buffer in the external memory module is configured to store characteristic values of the memory to provide to the mobile device to enable the mobile device to make adjustments to an interface with the external memory module based on the characteristic values.

In an example embodiment of the invention, a communications interface in an external memory module is configured to communicate with a mobile reader/writer device. A memory in the external memory module is configured to store code and data to provide to the mobile reader/writer device to enable distributed execution-in-place for the reader/writer device when the external memory module is communicating with the reader/writer device. And a buffer in the external memory module is configured to store characteristic values of the memory to provide to the mobile reader/writer device to enable the reader/writer device to make adjustments to an interface with the external memory module based on the characteristic values. The characteristic values of the memory may include speed, size, response time or data persistence. The memory may be a non-volatile memory, a phase-change memory, a resistive random access memory, a magnetic random access memory, a solid-electrolyte memory, a ferroelectric random access memory, a organic and polymer memory, or the like.

An example embodiment of the invention includes communicating using a communications interface in a mobile device, with a first external device containing a suitable memory of at least two external devices containing a suitable memory, the first external device being at a first location. The embodiment further includes making adjustments with an operating system in the mobile device, to an interface with the first external device based on detected characteristics of the suitable memory in the first external device. The embodiment further includes executing-in-place in a processor in the mobile device, a portion of a program in the suitable memory contained in the first external device and storing a current program instruction when it stops the execution at the first location. The embodiment further includes communicating using the communications interface in the mobile device, with a second external device containing a suitable memory having the program stored therein, of the at least two external devices, the second external device being at a second location. The embodiment further includes making adjustments with the operating system in the mobile device, to an interface with the second external device based on detected characteristics of the suitable memory in the second external device. And the embodiment further includes resuming to execute-in-place the program at a next program instruction following the stored current program instruction when communicating with the second external device at the second location.

DESCRIPTION OF THE FIGURES

FIG. 4 is an example flow diagram of an example embodiment, depicting steps in the procedure 400 carried out by a mobile device in executing-in-place program code stored in one or more suitable memory modules of any of the one or more external devices when communicating with any of the external devices.

FIG. 6 is an example flow diagram of an example embodiment, depicting steps in the procedure 600 carried out by a mobile device in executing-in-place consecutive portions of a program stored in suitable memory of two or more external devices, as the mobile device moves from a first location of a first external device to a second location of a second external device.

DISCUSSION OF EXAMPLE EMBODIMENTS OF THE INVENTION

Figure 1A:
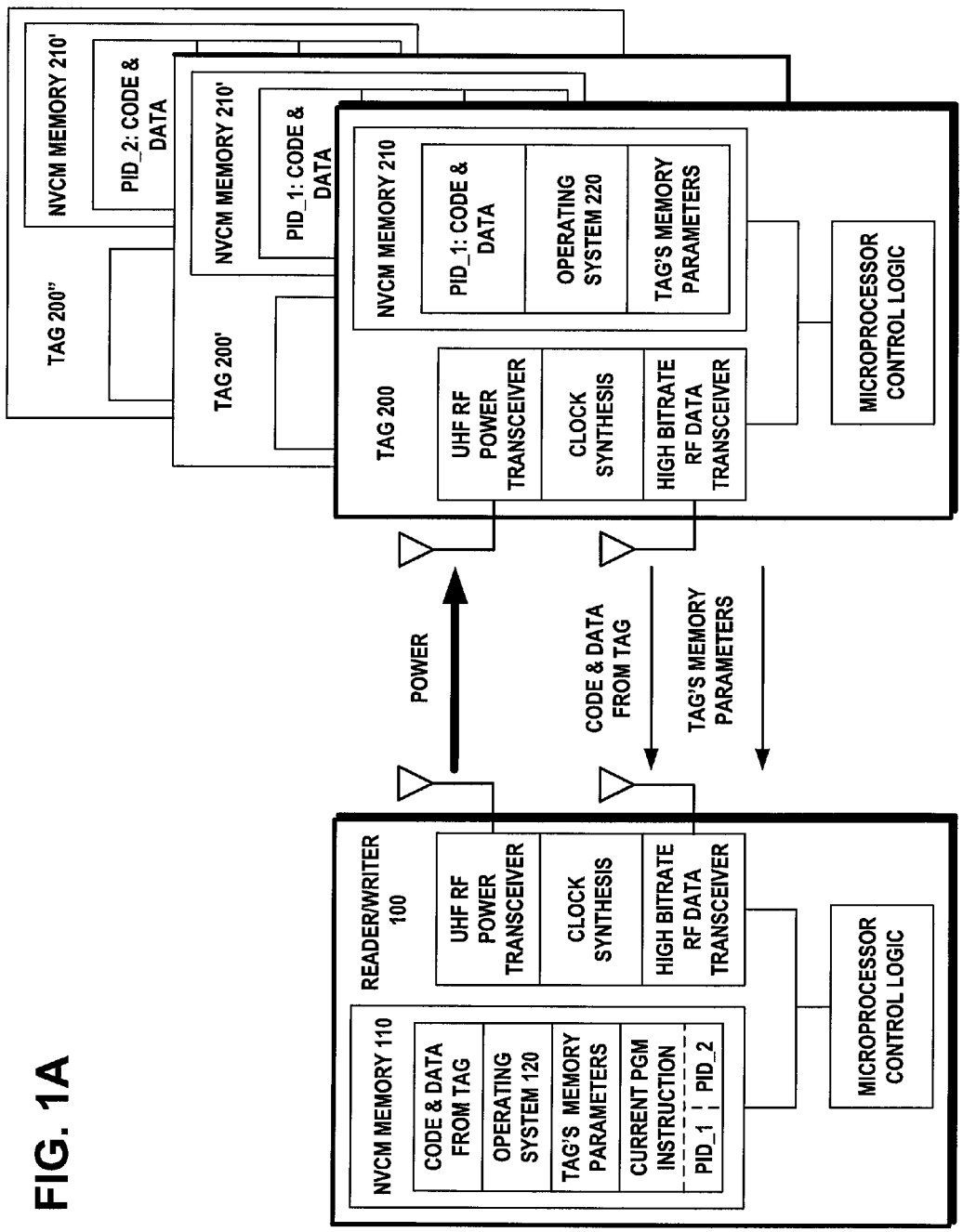
FIG. 1A illustrates an example embodiment for the reader 100 transmitting RF power to the tag 200 and the tag transmitting code and data and its speed and persistence parameters to the reader, for execution-in-place by the reader.

At least one example embodiment of the present invention and its potential advantages are understood by referring to FIGS. 1A through 6 of the drawings.

At a basic level, any computing platform consists of execution pipeline and memory facilities that are in charge of maintaining the availability of code and data for continued execution and memory access. Thus, in applications and information allocation, the main constraints are the amount of such execution memory facilities that provide random access and high performance within a reasonable cost in terms of energy and material.

The communication system of the MINAmI Project, referred to herein as Universal Local Storage (ULS) system, may provide high data rate communication at 10-100 Mbit/s between a reader/writer device and RF tags containing a large memory (e.g., one or more Gigabits) operating over a very high data rate communication channel (e.g., impulse radio ultra wide band (UWB) at 7.9 GHz). The example embodiments disclosed herein may be designed on top of a Universal Local Storage (ULS) system. The Universal Local Storage (ULS) system may be based on near field communication and enable "smart spaces" where a number of devices may use a shared view of resources and services. Smart spaces may provide a better user experience by allowing the user to bring in new devices flexibly and to access all the information in the multi device system from any of the devices.

Universal Local Storage (ULS) may enable various use cases, such as following examples:

I) Write data to a reader/writer apparatus, such as a mobile phone:

High speed data is transferred from wireless memory tags with novel proximity radio.

II) Local sharing:
  Share more than 10 pictures or multiple MP3 music tracks over a high data rate connection from a first reader/writer apparatus to a second reader/writer apparatus by simple touch operation.
III) Local content: share and explore:
  Achieve very fast download times when reading large amounts of information contents from wireless memory tags, such as 10 seconds when reading 1 Gigabit of content from passive and battery-less memory tags.
  Store content from a reader/writer apparatus, such as a mobile phone, to battery-less memory tags.

The example embodiments of the invention disclosed herein provide an adaptive computing platform for Universal Local Storage (ULS) system. The example embodiments utilize external memory resources of the ULS system as non-volatile memory blocks to provide execution-in-place capability for a reader/writer device, such as a mobile phone, to enhance the processing power of the device.

In order for the reader/writer device to utilize the external memory resources for enhanced processing, the execution architecture of the device according to at least one embodiment of the present invention needs to be scalable and adaptive to accommodate variations in the response time and data persistence of different memory blocks it encounters as it moves within the ULS system. This is provided in the example embodiments by an operating system (OS) in a dedicated memory area in the reader/writer device, which is adjustable based on detected type of non-volatile memory resource (e.g. RF memory tags) it currently uses.

Example memory technologies, such as Phase-change memory (PRAM), Resistive RAM (ReRAM), Magnetic RAM (MRAM), solid-electrolyte (SE) memory, Ferroelectric RAM (FeRAM), organic and polymer memory, enable a computing environment that provides efficient, seamless utilization by the reader/writer device as it moves from one memory block to another. These non-volatile memory technologies are collectively referred to herein as NVCM (non-volatile candidate memory) technologies. Memory devices respectively based on any one of these latest memory technologies have their own respective response time and data persistence characteristics unique to the respective technology. There may be other respective memory characteristics, such as requirements for error correction codes (EEC), signal patterns, or data formatting. In example embodiments of the invention, when a reader/writer device moves from using a first ULS module having an external memory based on a first NVCM technology to using a second ULS module having an external memory based on a second NVCM technology, the reader/writer device may adjust its interface to the different external memory characteristics.

In example embodiments of the invention, the same program or data file may be stored in the external memories of several ULS memory modules at several respective locations, allowing the reader/writer device to move from one location to another. The reader/writer device may execute-in-place a portion of the program at the first location and store the current program instruction when it stops the execution at the first location. It may then move to the second location, where it may resume to execute-in-place the program by resuming at the next program instruction following the previously stored current program instruction. It may combine both locations and any other locations within ULS functional vicinity in order to either resume or suspend program instructions.

FIG. 1A illustrates an example embodiment for the reader/writer device 100 transmitting RF power to the ULS tag memory module 200 and the tag memory module 200 transmitting code and data and its speed and persistence parameters to the reader/writer device 100, for execution-in-place by the reader/writer device 100. The figure shows several ULS tag memory modules 200, 200', and 200" located at different locations. Each of the ULS tag memory modules 200, 200', and 200" may have a mutually different memory technology having mutually different memory characteristics such as response time and data persistence. The first tag memory module 200 at the first location includes a NVCM memory 210 embodied in a first type memory technology such as Phase-change memory (PRAM), which stores a first program identified as PID_1 that includes its program code and data. The second tag memory module 200' at the second location includes a NVCM memory 210' embodied in a second type memory technology such as Resistive RAM (ReRAM), which stores the same first program PID_1 with its program code and data. The reader/writer device 100 may execute-in-place a portion of the program PID_1 in the first tag memory module 200 at the first location and store the current program instruction when it stops the execution at the first location. The reader/writer device 100 may then move to the second location, where it may resume to execute-in-place the program PID_1 in the second tag memory module 200' by resuming at the next program instruction following the previously stored current program instruction. The third tag memory module 200" at the third location includes a NVCM memory 210" embodied in a third type memory technology such as Magnetic RAM (MRAM), which stores a second program identified as PID_2 that includes its program code and data different from that of PID_1. The reader/writer device 100 may execute-in-place the program PID_2 in the third tag memory module 200" at the third location.

The example reader/writer device 100 of FIG. 1A includes an ultra-high frequency (UHF) power transceiver that transmits RF power to the tag memory module 200. The tag memory module 200 may include a non-volatile candidate memory (NVCM) 210 that stores code and data. The non-volatile candidate memory (NVCM) 210 of the tag memory module 200 also stores the tag's response time and data persistence parameters and other characteristics of the Phase-change memory (PRAM) first type memory technology. The tag memory module 200 includes a high bitrate RF data transceiver that transmits the tag's response time and data persistence parameters and other characteristics to the reader/writer device 100 for storage in the non-volatile candidate memory (NVCM) 110.

The non-volatile candidate memory (NVCM) 110 in the example reader/writer device 100 of FIG. 1A includes an operating system program 120. The operating system 120 reads the memory characteristics of the NVCM memory 210 transmitted from the ULS tag memory module 200 with which the reader/writer device 100 is currently communicating. The operating system 120 then adjusts its interface to the unique external memory characteristics of the Phase-change memory (PRAM) technology in the NVCM memory 210 of the ULS tag memory module 200. In some embodiments of the invention, the ULS tag memory module 200 may include its own operating system 220 in its NVCM memory 210, which may have many of the functions performed by the operating system 120 of the reader/writer device 100.

According to an example embodiment, the operating system 120 in the reader/writer device 100 processes the tag's response time and data persistence parameters and adjusts the organization of the NVCM memory 110 and the speed and characteristics of the high bitrate RF data transceiver to accommodate the Phase-change memory (PRAM) technology parameters of the tag memory module 200 at the first location. The tag memory module 200 then transmits the tag's PID_1 program code and data with the high bitrate RF data transceiver to the reader/writer device 100 for storage in the non-volatile candidate memory (NVCM) 110. The microprocessor or processor control logic in the reader/writer device 100 can then load the tag's code and perform an execution-in-place, operating on the tag's data. The reader/writer device 100 may execute-in-place a portion of the program PID_1 in the first tag memory module 200 at the first location and store the current program instruction when it stops the execution at the first location.

The reader/writer device 100 may then move to the second location, where it may resume to execute-in-place the program PID_1 in the second tag memory module 200' by resuming at the next program instruction following the previously stored current program instruction according to an example embodiment of the present invention. The operating system 120 in the reader/writer device 100 processes the response time and data persistence parameters of the second tag memory module 200' and adjusts the organization of the NVCM memory 110 and the speed and characteristics of the high bit rate RF data transceiver to accommodate the Resistive RAM (ReRAM) technology parameters of the tag memory module 200' at the second location.

The third tag memory module 200" at the third location includes a NVCM memory 210" that stores a second program identified as PID_2 that includes its program code and data different from that of PID_1. The reader/writer device 100 may execute-in-place the program PID_2 in the third tag memory module 200" at the third location. The operating system 120 in the reader/writer device 100 processes the response time and data persistence parameters of the third tag memory module 200" and adjusts the organization of the NVCM memory 110 and the speed and characteristics of the high bit rate RF data transceiver to accommodate the Magnetic RAM (MRAM) technology parameters of the tag memory module 200" at the third location.

Figure 1B:
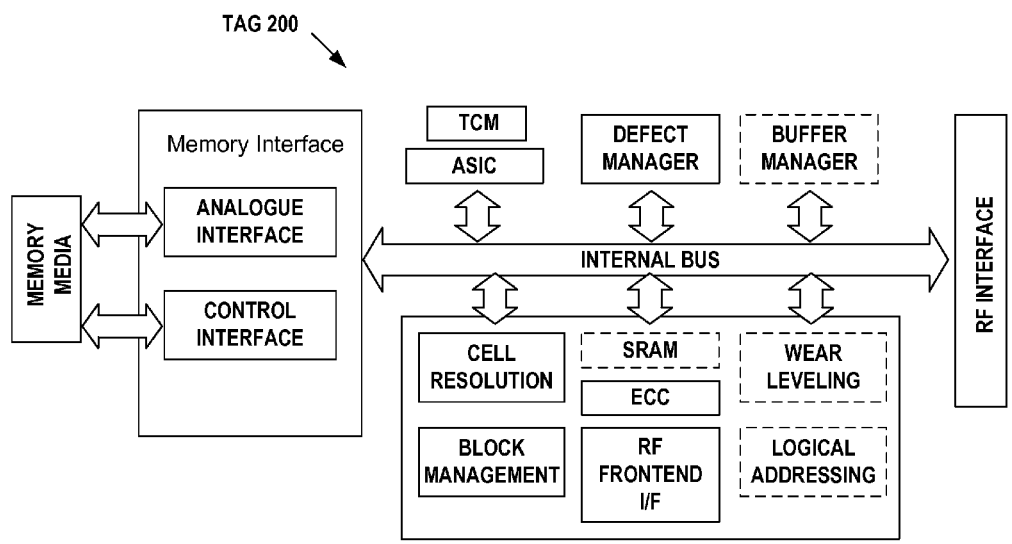
FIG. 1B illustrates an example embodiment for an RF based memory Universal Local Storage (ULS) architecture diagram.

FIG. 1B illustrates an example embodiment for an RF based memory (ULS) architecture diagram of a distributed memory block, such as the ULS tag memory modules 200, 200', and 200". The memory media is a large memory, for example a non-volatile candidate memory (NVCM), on the order of a gigabyte in the distributed memory block. The memory interface connects the memory media to the internal bus that services an application specific integrated circuit (ASIC), defect manager, buffer manager, cell resolution module, block management module, static RAM (SRAM), error correction code (EEC), an RF Front end, wear leveling module, logical addressing module, and RF interface. The RF interface enables RF power and communication from the reader/writer device 100 shown in FIG. 2. The ASIC, block management and logical addressing modules may include instruction processing logic to execute programmed instructions to carry out the functions of the distributed memory block.

Figure 2:
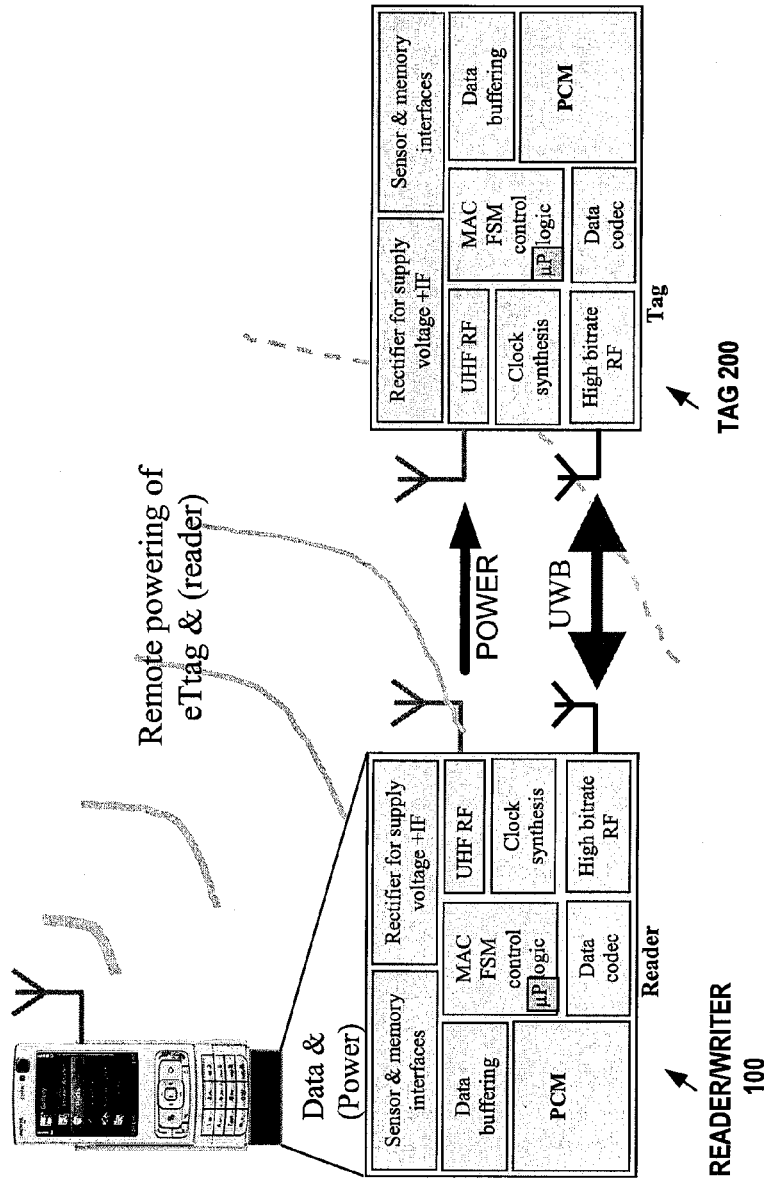
FIG. 2 illustrates an example embodiment for RF based memory (ULS) system.

In the ULS memory architecture of FIG. 1B, the energy consumption is influenced directly by performance control and data reliability parameters. FIG. 1B shows the computing environment where memory is integrated with the RF based architecture. FIG. 2 illustrates an example embodiment for RF based memory (ULS) system. The memory blocks are distributed execution memory blocks (ULS), such as the ULS tag memory modules 200, 200', and 200", which are dispersed around the high context run-time environment, e.g. Smart space(s). The ULS tag memory modules 200, 200', and 200" may include an operating system (OS) 220 and corresponding components that conform to a Smart space architecture. Therefore, the distributed memory blocks are considered as one persistent stackable execution memory element.

FIG. 2 shows an example embodiment of the reader/writer device 100 in a reader/writer apparatus, such as a cellular phone. The reader/writer device 100 includes a UHF RF module connected to a first RF antenna to transmit RF power and clock pulses on a 900 MHz carrier to the tag module for powering and timing the circuits of the tag module. The reader/writer device 100 includes a High Bitrate RF module connected to a second RF antenna to exchange data over an impulse radio ultra wide band (UWB) link with the tag memory module 200. The reader/writer device 100 includes a medium access control (MAC) finite state machine (FSM) microprocessor control logic to control the other components in the reader/writer device 100 and to execute programmed instructions to carry out the functions of the reader/writer device 100. A non-volatile candidate memory (NVCM) module serves as a storage medium for the reader/writer device 100. In addition, there are data buffering, data codec, sensor and memory interface, and rectifier modules in the reader/writer device 100.

FIG. 2 shows further an example of the tag memory module 200 constituting one of the distributed memory blocks. The tag memory module 200 includes a UHF RF module connected to a first RF antenna to receive RF power and clock pulses on a 900 MHz carrier from the reader/writer device 100 for powering and timing the circuits of the tag memory module 200. The tag memory module 200 includes a High Bitrate RF module connected to a second RF antenna to exchange data over the impulse radio ultra wide band (UWB) link with the reader/writer device 100. The tag memory module 200 includes a MAC FSM microprocessor control logic to control the other components in the tag memory module 200 and to execute programmed instructions to carry out the functions of the tag memory module 200. A non-volatile candidate memory (NVCM) module serves as the storage medium for the tag memory module 200. In addition, there are data buffering, data codec, sensor and memory interface, and rectifier modules in the tag memory module 200.

The distributed ULS tag memory modules 200, 200', and 200" may provide different granularities of task/data execution. Since different ULS tag memory modules can provide different granularities of task/data execution, a run-time environment task allocator in the reader/writer device 100 is used to provide real-time or just-in-time adjustment of task/data dispersing/aggregation. A Run-time environment task scheduler in the reader/writer device 100 is used to provide real-time or just-in-time adjustment of task/data dispersing/aggregation.

The non-volatile nature of the memory blocks within ULS tag memory modules 200, 200', and 200", and their nearly dynamic RAM (DRAM) performance, provide distributed execution-in-place (XiP) and store-n-download (SnD) support for the reader/writer device 100 according to an example embodiment of the present invention.

Therefore, when reader/writer device 100 is a "borrower" within the ULS infrastructure, task/data can be dispersed on a skewed or uniform basis while the task/data granularity can be adjusted (e.g. decreased) dynamically around the ULS infrastructure members, e.g. ULS tag memory modules 200, 200', and 200". Thus, the amount of any available memory within those ULS tag memory modules 200, 200', and 200" can be "loaned" to the reader/writer device "borrower" 100.

Due to the non-volatile nature of ULS tag memory modules 200, 200', and 200", the reader/writer device 100 can move away from a currently used memory block and the whole execution context may be suspended and instantly resumed later.

Figure 3:
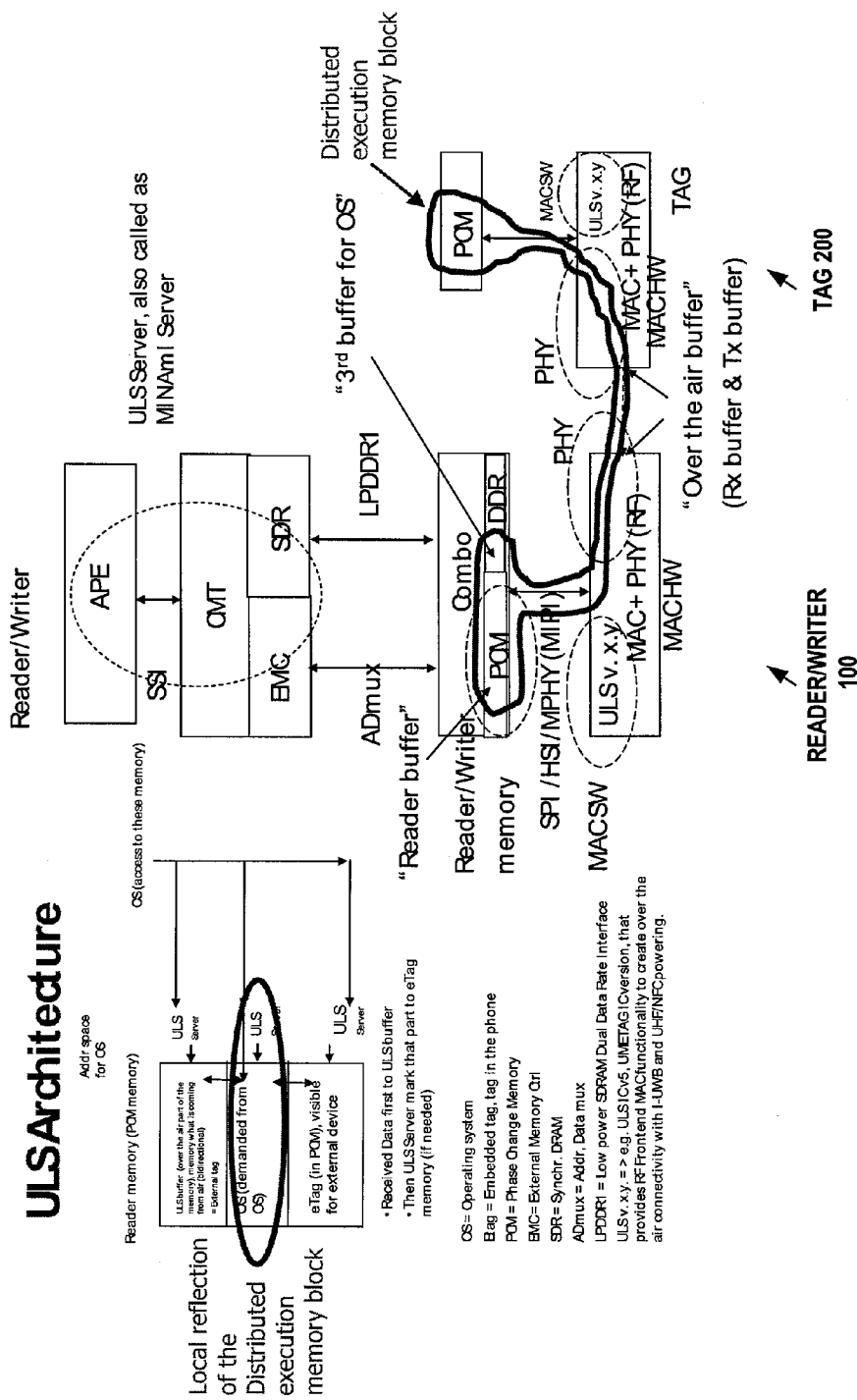
FIG. 3 illustrates an example embodiment for a ULS memory address space architecture.

FIG. 3 illustrates an example embodiment for a ULS memory address space architecture. The figure shows the reader/writer device 100 and the tag memory module 200 containing the distributed execution memory block.

In the example reader/writer device 100, the non-volatile candidate memory (NVCM) may be implemented as a Phase-change memory (labeled PCM), which stores the ULS buffer that serves as the over the air part of the memory to exchange data via the ultrawide band (UWB) link with the ULS tag memory module 200. In the reader/writer device 100, the PCM memory stores the memory address space accessible by the operating system (OS). In the reader/writer device 100, the PCM memory stores the memory address space accessible by embedded tag (eTag) in the phone that is visible for external devices. The reader/writer device 100's PCM memory connects through the media access control (MAC) layer and physical radio frequency (PHY(RF)) layer to the PCM memory of the tag memory module 200 through its MAC and PHY(RF) layers. The non-volatile candidate memory (NVCM) (labeled PCM) of the tag memory module 200 is the distributed execution memory block.

The example reader/writer device 100 of FIG. 3 includes the ULS server that includes the application program engine (APE) connected through the synchronous serial interface (SSI) to the cellular modem transport (device) (CMT), the external memory controller (EMC), and the synchronous DRAM controller (SDR). The ULS server is connected through the address-data multiplexed bus (ADmux) and the low power dual data rate type 1 (LPDDR1) to the reader/writer buffer. The reader/writer buffer includes the phase-change memory (PCM) and the dual data rate (DDR). The reader/writer buffer is connected to the media access control (MAC) and the physical layer (PHY) with its radio frequency (RF) (front-end circuitry) and transmit (Tx)/receive (Rx) buffer. The radio frequency (RF) (front-end circuitry) may be impulse radio ultra wide band (I-UWB) for data communication and ultra-high frequency (UHF) near field communication (NFC) for power transmission from the reader/writer device 100 to the ULS tag memory module 200.

The example ULS tag memory module 200 of FIG. 3 has its media access control (MAC) and the physical layer (PHY) with its radio frequency (RF) (front-end circuitry) and transmit (Tx)/receive (Rx) buffer communicating over the air with the physical layer (PHY) radio frequency (RF) (front-end circuitry) of the reader/writer device 100. The ULS tag 200 media access control (MAC) is then connected to the non-volatile candidate memory (NVCM) (labeled PCM) of the tag module 200, which is the distributed execution memory block.

In another example embodiment, the processor in the reader/writer device 100 may consist of only a cellular modem transport (device) (CMT) that has an extended execution memory, so that the application program engine (APE) and CMT are integrated. In another example embodiment, an RF front end may be integrated with the application program engine (APE), so that that APE execution memory is equipped with an RF front end. The connectivity may be enhanced by using alternatives to the interfaces and protocol shown in FIG. 3. For example, a low-power dual data rate type 2 non-volatile memory (LPDDR2-NVM) may be used. As another example, a universal flash storage (UFS) may be used. As another example, applying physical layer (PHY) types such as M-PHY may be used, which is the physical layer behind UFS. As another example, other protocols may be used, such as Unified Protocol (UniPro), which is a high-speed interface technology for interconnecting integrated circuits in mobile phones or comparable devices. The schemes of connectivity between the memory modules, RF front-end and processor can be driven by a fully routable protocol, for example UniPro, providing a computing device modular architecture. Interfaces, connectivity components and protocols as suggested, but not limited by the above examples, may be used interchangeably with any other components providing the similar functionality.

According to an example embodiment, the operating system (OS) 120 of the reader/writer device 100 includes program instructions, which when executed by the microprocessor in the reader/writer 100, perform the steps in the following procedure in Table 1.

TABLE 1

The following distributed procedure for ULS tag memory modules is performed:
1. to validate any existed suspended task/data grains schema
2. redistribute task/data grains according to newly defined scale
   a. due to newly generated grains scheme previous grains scheme may be invalidated
3. reallocate task/data that was written before to the particular ULS tag module
   a. before newly generated task/data scheme can be applied, the previously written task/data should be reallocated, either to temporary buffer, or to new permanent location
4. update the map of task/data blocks allocation
   a. since task/data should reallocated, the logical addressing and corresponding maps should be updated
5. task/data grains resumed
6. normal operation mode is active, task/data block synchronization between the ULS tag modules can be done through implicit and/or explicit cache directory management Suspend mode can be activated at any moment then:
7. Task/data grain scheme is kept all the time by the execution context initiator (preferably by reader/writer) through the ULS run-time environment memory address space (FIG. 3) which is transparently visible by run-time environment (FIG. 3) and, managed through the ULS tag module memory address space
8. Thus any part of ULS infrastructure can be safely suspended/resumed In a rendering example for the Smart space case, any participant ULS tag memory module 200 of such run-time environment enabled with the ULS reader/writer device 100, is used as one block of execution memory, managed by execution context broker unit of the ULS reader/writer device 100, which is in charge of the task/data scheduling, dispersing and aggregating. The task/data dispersing and aggregation are then performed. This is described, for example by M. Rabin in his paper "Efficient Dispersal of Information for Security, Load Balancing, and Fault Tolerance", Journal of the ACM, Vol. 36(2), pp. 335-348, 1989, which is incorporated herein by reference. This may be supported by a distributed workload management. The execution context broker is dynamically assigned and allocated by Smart space according to the task management, as described for example by Hugo Krawczyk, "Distributed fingerprints and secure information dispersal", Proc. 12th ACM Symposium on Principles of Distributed Computing (PODC), pages 207-218, 1993, which is incorporated herein by reference.

The run-time environment execution context of the example reader/writer device 100 may take into account for example the following parameters to estimate and to fragment the execution context to the dispersed ULS tag memory modules 200:

maximum number of available memory blocks vs. available input/output instructions per second (IOPS)
available IOPS vs. memory block IOPS data size vs. available IOPS
energy consumption vs. reader/writer IOPS vs. memory block IOPS
IO lines vs. available IOPS vs. energy consumption Particular ULS tag memory modules 200 are fixed size, and may be mapped by the ULS server of the reader/writer device 100. According to the quality of service (QoS) policies, task/data that should be executed/written are marked with a service class and are written to the ULS tag memory modules 200. These areas are fixed in the sense of task/data granularity. The size of these grains may be chosen in scaled manner, meaning that, to improve efficient mapping, any block of any ULS tag memory module 200 can be appended to another ULS tag memory module 200' by means of a grains adjustment. Thus, the task/data grains scheme is determined.

The run-time environment may analyze activity pattern and produce the necessary mapping by means of task/data importance weight and cost to handle. Thus, task/data grains scheme is kept updated. These features may be provided and guaranteed for example by Smart space infrastructure. However, some additional hints may be taken in account. Such hints can be produced by the run-time environment participant (Smart space member) or in particular by the application (Smart space application), which is a consumer or producer of those task/data units. By means of hints, the sequence of execution of task/data units may be inferred and the units then may be sequentially organized in the tag memory modules 200 for more efficient fetching and execution.

According to an example embodiment, the operating system (OS) 120 of the reader/writer device 100 includes program instructions, which when executed by the microprocessor in the reader/writer device 100, perform the steps in the following procedure in Table 2.

TABLE 2

In case of task/data Write:
1. ULS server client (e.g. application or member of run-time environment) is setting the Write task/data grains scheme
2. ULS server, receives scheme and maps it to the transparent OS memory address space (FIG. 3), then process it
3. actual processing consists of
a. command sequencing
b. vectoring to the command routine
c. determining importance weight of task/data and cost of handling by means of buffer history analysis
d. determining whether task/data should be written
e. according to the determined QoS policies ULS server is accessing particular ULS tag module
4. buffered task/data are written to the media
5. ULS module is reporting on operation completion
Under the step (d) task/data can be written ULS tag module is taking in account the following factors:
    needed task/data reliability
    estimated energy efficiency
    needed performance/latency
    or combination of above factors,
    for the certain types of ULS tag modules.

According to an example embodiment, the operating system (OS) 120 of the reader/writer device 100 includes program instructions, which when executed by the microprocessor in the reader/writer device 100, perform the steps in the following procedure in Table 3.

TABLE 3

In case of task/data Read:
1. task/data ULS server client (e.g. application or member of run-time environment) is setting to Read task/data grains scheme which TABLE 3-continued points a certain logical starting ULS tag module address, reflected in eTag/OS memory address space (FIG. 3)
2. ULS server, receives scheme and process it
3. actual processing consists of
a. command sequencing
b. vectoring to the command routine
c. calculating physical ULS tag module address by means of logical address decoding
d. according to the identified priority level of task/data ULS server is accessing particular ULS tag module
4. located task/data grains are fetched and delivered to the client
5. ULS tag module is reporting on operation completion
Priority level can be determined with help of importance weight that the particular run-time environment can generate (e.g. Smart space). Separate from the lifetime activities of the ULS tag module the housekeeping procedure is defined. It can be undertaken in real-time or in offline mode while system has enough energy and no load.
Balanced management in the dynamic and constrained environment has the following parameters throughout the functioning of the computing environment:
    maximum number of available memory blocks vs. client IOPS
    reader/writer IOPS vs. memory block IOPS
    data size vs. reader/writer IOPS
    energy consumption vs. reader/writer IOPS vs. memory block IOPS
    IO lines vs. IOPS vs. energy consumption FIG. 4 is an example flow diagram of an example embodiment, depicting steps in the procedure 400 carried out by a device in executing-in-place program code stored in one or more suitable memory modules of any of the one or more external devices when communicating with any of the external devices. The steps in the procedure of the flow diagram of FIG. 4 may be embodied as program logic stored in the memory 110 of the reader/writer device 100 of FIG. 1A in the form of sequences of programmed instructions which, when executed in the microprocessor control logic of the reader/writer device 100 of FIG. 1A, carry out the functions of an exemplary disclosed embodiment. The steps in the procedure 400 are as follows:

Step 402: communicating using a communications interface, with one or more external devices containing one or more suitable memory modules;

Step 404: executing-in-place in a processor, program code stored in the one or more suitable memory modules of any of the one or more external devices when communicating with said any of the one or more external devices; and Step 406: making adjustments with an operating system, to an interface with the external devices based on detected characteristics of the one or more suitable memory modules contained in the external device with which it is currently communicating.

Figure 5:
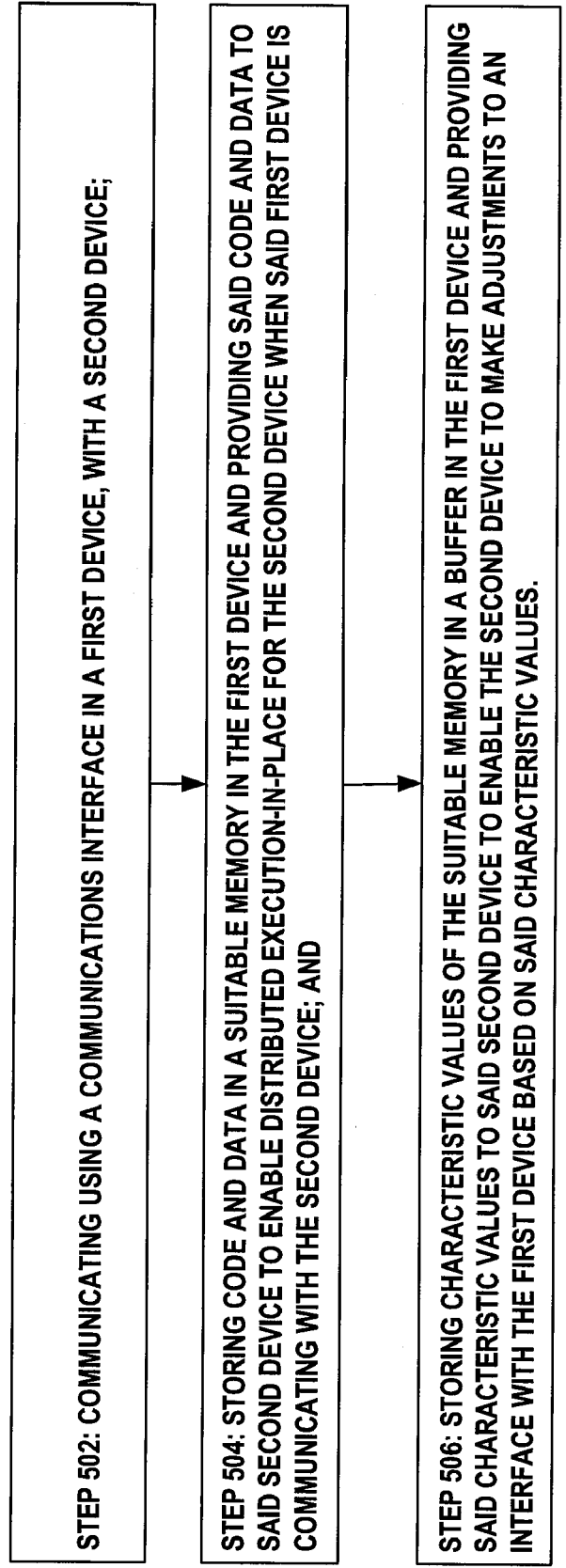
FIG. 5 is an example flow diagram of an example embodiment, depicting steps in the procedure 500 carried out by a first device containing a suitable memory providing code and data to a second device to enable distributed execution-in-place for the second device when the first device is communicating with the second device.

FIG. 5 is an example flow diagram of an example embodiment, depicting steps in the procedure 500 carried out by a first device containing a suitable memory providing code and data to a second device to enable distributed execution-in-place for the second device when the first device is communicating with the second device. The steps in the procedure of the flow diagram of FIG. 5 may be embodied as program logic stored in the memory 210 of the tag memory module 200 of FIG. 1A in the form of sequences of programmed instructions which, when executed in the microprocessor control logic of the tag memory module 200 of FIG. 1A, carry out the functions of an exemplary disclosed embodiment. The steps in the procedure 500 are as follows:

Step 502: communicating using a communications interface in a first device, with a second device;

Step 504: storing code and data in a suitable memory in the first device and providing said code and data to said second device to enable distributed execution-in-place for the second device when said first device is communicating with the second device; and Step 506: storing characteristic values of the suitable memory in a buffer in the first device and providing said characteristic values to said second device to enable the second device to make adjustments to an interface with the first device based on said characteristic values.

FIG. 6 is an example flow diagram of an example embodiment, depicting steps in the procedure 600 carried out by a mobile device in executing-in-place consecutive portions of a program stored in suitable memory of two or more external devices, as the mobile device moves from a first location of a first external device to a second location of a second external device. The steps in the procedure of the flow diagram of FIG. 6 may be embodied as program logic stored in the memory 110 of the reader/writer device 100 of FIG. 1A in the form of sequences of programmed instructions which, when executed in the microprocessor control logic of the reader/writer device 100 of FIG. 1A, carry out the functions of an exemplary disclosed embodiment. The steps in the procedure 600 are as follows:

Step 602: communicating using a communications interface in a mobile device, with a first external device containing a suitable memory of at least two external devices containing a suitable memory, the first external device being at a first location.

Step 604: making adjustments with an operating system in the mobile device, to an interface with the first external device based on detected characteristics of the suitable memory in the first external device.

Step 606: executing-in-place in a processor in the mobile device, a portion of a program in the suitable memory contained in the first external device and storing a current program instruction when it stops the execution at the first location.

Step 608: communicating using the communications interface in the mobile device, with a second external device containing a suitable memory having the program stored therein, of the at least two external devices, the second external device being at a second location.

Step 610: making adjustments with the operating system in the mobile device, to an interface with the second external device based on detected characteristics of the suitable memory in the second external device.

Step 612: resuming to execute-in-place the program at a next program instruction following the stored current program instruction when communicating with the second external device at the second location.

Example embodiments of the invention include an apparatus, comprising:

means for communicating using a communications interface, with one or more external devices containing one or more suitable memory modules;

means for executing-in-place in a processor, program code stored in the one or more suitable memory modules of any of the one or more external devices when communicating with said any of the one or more external devices; and means for making adjustments with an operating system, to an interface with the external devices based on detected characteristics of the one or more suitable memory modules contained in the external device with which it is currently communicating.

Other example embodiments of the invention include an apparatus, comprising:

means for communicating using a communications interface in a first device, with a second device;

means for storing code and data in a suitable memory in the first device and providing said code and data to said second device to enable distributed execution-in-place for the second device when said first device is communicating with the second device; and means for storing characteristic values of the suitable memory in a buffer in the first device and providing said characteristic values to said second device to enable the second device to make adjustments to an interface with the first device based on said characteristic values.

Other example embodiments of the invention include an apparatus, comprising:

means for communicating using a communications interface in a mobile device, with a first external device containing a suitable memory of at least two external devices containing a suitable memory, the first external device being at a first location;

means for making adjustments with an operating system in the mobile device, to an interface with the first external device based on detected characteristics of the suitable memory in the first external device;

means for executing-in-place in a processor in the mobile device, a portion of a program in the suitable memory contained in the first external device and storing a current program instruction when it stops the execution at the first location;

means for communicating using the communications interface in the mobile device, with a second external device containing a suitable memory having the program stored therein, of the at least two external devices, the second external device being at a second location;

means for making adjustments with the operating system in the mobile device, to an interface with the second external device based on detected characteristics of the suitable memory in the second external device, and means for resuming to execute-in-place the program at a next program instruction following the stored current program instruction when communicating with the second external device at the second location.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that is stored permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. An apparatus, comprising:
a communications interface configured to communicate with one or more external devices containing one or more suitable memory modules;
a processor configured to provide distributed execution-in-place capability for the apparatus when communicating with any of the one or more external devices; and
an operating system configured to make adjustments to the interface with the external devices based on detected characteristics of the one or more suitable memory modules contained in the external device with which it is currently communicating, to adjust task/data granularity of a program to be fetched from or written to the one or more suitable memory modules.

2. The apparatus of claim 1, wherein said detected characteristics of the one or more suitable memory modules including speed, size, response time or data persistence.

3. The apparatus of claim 1, wherein:
said operating system and processor are configured to execute-in-place a portion of a program in a suitable memory module contained in a first external device of the one or more external devices at a first location and store a current program instruction when it stops the execution at the first location; and
said operating system and processor are further configured to resume the execution-in-place of the program by resuming at a next program instruction following the stored current program instruction when the apparatus has moved to a second location with a second external device containing one or more suitable memory modules having the program stored therein, of the one or more external devices.

4. The apparatus of claim 1, wherein
said suitable one or more memory modules comprise non-volatile memories drawn from the group consisting of phase-change memory, resistive random access memory, magnetic random access memory, solid-electrolyte memory, ferroelectric random access memory, organic and polymer memory.

5. A method, comprising:
communicating using a communications interface, with one or more external devices containing one or more suitable memory modules;
executing-in-place in a processor, program code stored in the one or more suitable memory modules of any of the one or more external devices when communicating with said any of the one or more external devices; and
making adjustments with an operating system, to the interface with the external devices based on detected characteristics of the one or more suitable memory modules contained in the external device with which it is currently communicating, to adjust task/data granularity of a program to be fetched from or written to the one or more suitable memory modules.

6. The method of claim 5, wherein:
wherein said detected characteristics of the one or more suitable memory modules including speed, size, response time or data persistence.

7. The method of claim 5, wherein:
executing-in-place in the processor a portion of a program in a suitable memory module contained in a first external device of the one or more external devices at a first location and store a current program instruction when it stops the execution at the first location;
resuming to execute-in-place the program at a next program instruction following the stored current program instruction when communicating with a second external device containing one or more suitable memory modules having the program stored therein, of the one or more external devices.

8. The method of claim 5, wherein:
said suitable one or more memory modules comprise non-volatile memories drawn from the group consisting of phase-change memory, resistive random access memory, magnetic random access memory, solid-electrolyte memory, ferroelectric random access memory, organic and polymer memory.

9. A computer readable non-transitory medium, comprising:
a computer readable medium having computer program code therein;
program code in said computer readable medium, for communicating using a communications interface, with one or more external devices containing one or more suitable memory modules;
program code in said computer readable medium, for executing-in-place in a processor, program code stored in the one or more suitable memory modules of any of the one or more external devices when communicating with said any of the one or more external devices; and
program code in said computer readable medium, for making adjustments with an operating system, to the interface with the external devices based on detected characteristics of the one or more suitable memory modules contained in the external device with which it is currently communicating, to adjust task/data granularity of a program to be fetched from or written to the one or more suitable memory modules.

10. An apparatus, comprising:
a communications interface in a first device configured to communicate with a second device;
a suitable memory in the first device configured to store code and data to provide to said second device to enable distributed execution-in-place for the second device when said first device is communicating with the second device; and
a buffer in the first device configured to store characteristic values of the suitable memory to provide to said second device to enable the second device to make adjustments to the interface with the first device based on said characteristic values, to adjust task/data granularity of a program to be fetched from or written to the suitable memory.

11. The apparatus of claim 10, wherein:
said characteristic values of the suitable memory including speed, size, response time or data persistence.

12. The apparatus of claim 10, wherein:
said suitable memory comprises a non-volatile memory drawn from the group consisting of phase-change memory, resistive random access memory, magnetic random access memory, solid-electrolyte memory, ferroelectric random access memory, organic and polymer memory.

13. A method, comprising:
communicating using a communications interface in a first device, with a second device;
storing code and data in a suitable memory in the first device and providing said code and data to said second device to enable distributed execution-in-place for the second device when said first device is communicating with the second device; and storing characteristic values of the suitable memory in a buffer in the first device and providing said characteristic values to said second device to enable the second device to make adjustments to the interface with the first device based on said characteristic values, to adjust task/data granularity of a program to be fetched from or written to the suitable memory.

14. The method of claim 13, wherein:
said characteristic values of the suitable memory including speed, size, response time or data persistence.

15. The method of claim 13, wherein:
said suitable memory comprises a non-volatile memory drawn from the group consisting of phase-change memory, resistive random access memory, magnetic random access memory, solid-electrolyte memory, ferroelectric random access memory, organic and polymer memory.

16. A computer readable non-transitory medium, comprising:
a computer readable medium having computer program code therein;
program code in said computer readable medium, for communicating using a communications interface in a first device, with a second device;
program code in said computer readable medium, for storing code and data in a suitable memory in the first device and providing said code and data to said second device to enable distributed execution-in-place for the second device when said first device is communicating with the second device; and
program code in said computer readable medium, for storing characteristic values of the suitable memory in a buffer in the first device and providing said characteristic values to said second device to enable the second device to make adjustments to the interface with the first device based on said characteristic values, to adjust task/data granularity of a program to be fetched from or written to the suitable memory.

17. A method, comprising:
communicating using a communications interface in a mobile device, with a first external device containing a suitable memory, of at least two external devices containing a suitable memory, the first external device being at a first location;
making adjustments with an operating system in the mobile device, to the interface with the first external device based on detected characteristics of the suitable memory in the first external device, to adjust task/data granularity of a program to be fetched from or written to the suitable memory of the first external device;
executing-in-place in a processor in the mobile device, a portion of the program in the suitable memory contained in the first external device and storing a current program instruction when it stops the execution at the first location;
communicating using the communications interface in the mobile device, with a second external device containing a suitable memory having the program stored therein, of the at least two external devices, the second external device being at a second location;
making adjustments with the operating system in the mobile device, to the interface with the second external device based on detected characteristics of the suitable memory in the second external device, to adjust task/data granularity of the program to be fetched from or written to the suitable memory of the second external device; and
resuming to execute-in-place the program at a next program instruction following the stored current program instruction when communicating with the second external device at the second location.

18. A mobile device, comprising:
a processor; and
a memory including executable instructions, the memory and executable instructions configured to, in cooperation with the processor, cause the mobile device to perform at least the following:
communicating using a communications interface in the mobile device, with a first external device containing a suitable memory of at least two external devices containing a suitable memory, the first external device being at a first location;
making adjustments with an operating system in the mobile device, to the interface with the first external device based on detected characteristics of the suitable memory in the first external device, to adjust task/data granularity of a program to be fetched from or written to the suitable memory of the first external device;
executing-in-place in a processor in the mobile device, a portion of the program in the suitable memory contained in the first external device and storing a current program instruction when it stops the execution at the first location;
communicating using the communications interface in the mobile device, with a second external device containing a suitable memory having the program stored therein, of the at least two external devices, the second external device being at a second location;
making adjustments with the operating system in the mobile device, to the interface with the second external device based on detected characteristics of the suitable memory in the second external device, to adjust task/data granularity of the program to be fetched from or written to the suitable memory of the second external device; and
resuming to execute-in-place the program at a next program instruction following the stored current program instruction when communicating with the second external device at the second location.

* * * * *